United States Patent Office 2,974,164
Patented Mar. 7, 1961

2,974,164
PREPARATION OF p-TOLUENESULFONYL ISOCYANATE

John E. Franz, Crestwood, Mo., assignor to Monsanto Chemical Company, St. Louis, Mo., a corporation of Delaware No Drawing. Filed Oct. 24, 1958, Ser. No. 769,290

5 Claims. (Cl. 260—545)

This invention relates to a new method for preparing p-toluenesulfonyl isocyanate which is an important intermediate used to prepare N-n-butyl-N'-p-toluenesulfonyl urea.

It is known that benzenesulfonyl isocyanate may be prepared from silver cyanate, an expensive reactant, and benzene sulfonyl chloride [1] in the following manner:

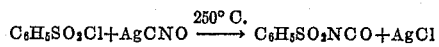

Attempts to modify the above reaction to form p-toluenesulfonyl isocyanate by refluxing a mixture of p-toluenesulfonyl chloride and potassium cyanate in either toluene or xylene were unsuccessful.

It is therefore an object of this invention to provide a method for preparing p-toluenesulfonyl isocyanate without the use of the more expensive silver cyanate as a reactant.

It is a further object of this invention to prepare p-toluenesulfonyl isocyanate in good yield thereby providing for a two-step preparation of the antiglycemic compound N-n-butyl-N'-p-toluenesulfonyl urea, instead of the conventional three-step method.

Additional objects will be apparent from a consideration of the following description.

According to this invention the process employed for preparing p-toluenesulfonyl isocyanate comprises generally reacting a mixture of p-toluenesulfonyl chloride and an alkali metal cyanate under reflux conditions in the presence of a highly polar solvent.

The following example is illustrative of the preferred embodiment of the methods of this invention.

EXAMPLE I p-Toluenesulfonyl isocyanate

A mixture consisting of 19 g. (0.1 mole) of p-toluenesulfonyl chloride, 8.5 g. (0.1 mole) of potassium cyanate, and 100 ml. of nitrobenzene was heated at the reflux temperature (215°) for one hour. The dark-brown gelatinous residue was distilled at reduced pressure. After the solvent had been removed, the fraction boiling at 90–120° (0.5 mm.) was collected and was redistilled. The major portion of this fraction was recollected at 93–96° (0.6 mm.). The resulting colorless oil reacted violently with water liberating carbon dioxide and leaving a precipitate of p-toluenesulfonamide. The infra-red spectrum verified the presence of an isocyanate group. Analysis indicated that the oil contained 6.55% chlorine which corresponds to a mixture consisting of 35% p-toluenesulfonyl chloride and 65% p-toluenesulfonyl isocyanate.

No reaction occurred when p-toluenesulfonyl chloride and potassium cyanate were heated at the reflux temperature in toluene or xylene.

[1] O. Billeter, Ber., 37, 690 (1904).

It will be apparent that with the economical preparation of p-toluenesulfonyl isocyanate according to the present invention that N-n-butyl-N'-p-toluenesulfonyl urea may be prepared in only two steps as follows:

(1)

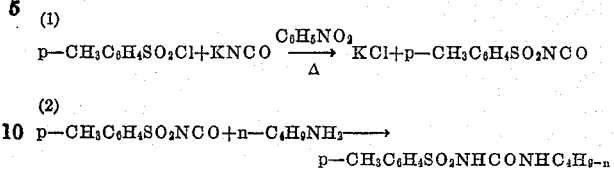

(2)

p—CH₃C₆H₄SO₂NCO+n—C₄H₉NH₂ ⟶
  p—CH₃C₆H₄SO₂NHCONHC₄H₉-n whereas the conventional method for preparing N-n-butyl-N'-p-toluenesulfonyl urea involves the following three steps:

(1)

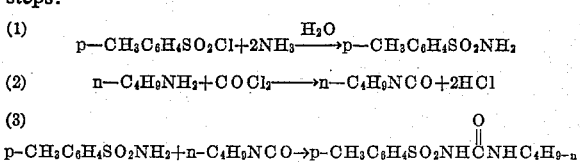

(2)   n—C₄H₉NH₂+COCl₂ ⟶ n—C₄H₉NCO+2HCl (3)
$$p\text{—}CH_3C_6H_4SO_2NH_2 + n\text{—}C_4H_9NCO \rightarrow p\text{—}CH_3C_6H_4SO_2NH\overset{O}{\overset{\|}{C}}NHC_4H_9\text{-}n$$

Other solvents which may be substituted for nitrobenzene include the following: nitrotoluene, nitroxylene, 1,3-dinitrobenzene, m-nitrochlorobenzene, o-nitrobiphenyl, α-nitronaphthalene, 3-nitropyridine, 8-nitroquinoline, benzonitrile, 1-naphthonitrile, 2-naphthonitrile, and the like. In general solvents which are highly polar in nature, inert under the conditions of the reaction, and have a boiling point around at least 200° C., will be found suitable.

The process of this invention includes other changes and modifications in the preferred embodiment of this invention as exemplified by the above example, such as the substitution of other alkali metal cyanates such as sodium cyanate and lithium cyanate for potassium cyanate. The temperature at which the reaction is carried out may be varied substantially from 150° C. to 250° C. depending at least in part upon the solvent employed. Heating of the reaction mixture is usually continued until substantial completion, the time required depending at least in part on the temperature used. Usually the reactants are used in stoichiometric or substantially stoiciometric proportions. While a substantial excess of one or the other of the reactants may be used, there is usually no advantage in so doing.

What is claimed is:

1. A method of preparing p-toluenesulfonyl isocyanate comprising reacting p-toluenesulfonyl chloride and an alkali metal cyanate at a temperature of 150–250° C. in the presence of a highly polar compound of the class consisting of nitrobenzene, nitrotoluene, nitroxylene, dinitrobenzene, nitrochlorobenzene, nitrobiphenyl, nitronaphthalene, nitropyridine, nitroquinoline, benzonitrile, and naphthonitrile.

2. The method of claim 1 in which the alkali metal cyanate is potassium.

3. The method of claim 1 in which the alkali metal cyanate is sodium.

4. The method of claim 1 in which the alkali metal cyanate is lithium.

5. A method of preparing p-toluenesulfonyl isocyanate comprising reacting p-toluenesulfonyl chloride and an alkali metal cyanate under reflux conditions with a solvent amount of nitrobenzene.

References Cited in the file of this patent
UNITED STATES PATENTS

| | | |
|---|---|---|
| 2,666,787 | Krzikalla | Jan. 19, 1954 |
| 2,866,802 | Graham | Dec. 30, 1958 |